(12) United States Patent
Naccache et al.

(10) Patent No.: US 12,480,424 B1
(45) Date of Patent: Nov. 25, 2025

(54) ACTIVE DE-AERATOR FOR AIRCRAFT POWER PLANT

(71) Applicant: PRATT & WHITNEY CANADA CORP., Longueuil (CA)

(72) Inventors: Gabriel Naccache, Longueuil (CA); Daniel Alecu, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/059,571

(22) Filed: Feb. 21, 2025

(51) Int. Cl.
| F01D 25/18 | (2006.01) |
| F01D 25/20 | (2006.01) |
| F02C 7/06 | (2006.01) |
| F02C 7/14 | (2006.01) |
| F02C 7/32 | (2006.01) |

(52) U.S. Cl.
CPC .............. *F01D 25/18* (2013.01); *F01D 25/20* (2013.01); *F02C 7/06* (2013.01); *F02C 7/14* (2013.01); *F02C 7/32* (2013.01); *F05D 2260/98* (2013.01)

(58) Field of Classification Search
CPC .... F02C 7/06; F02C 7/14; F01D 25/18; F01D 25/20; B01D 45/12; B01D 19/0026; B01D 19/0052; B01D 19/0057; F16N 39/002; F05D 2260/98; F05D 2260/608
See application file for complete search history.

(56) References Cited

U.S. PATENT DOCUMENTS

| 3,378,104 | A | 4/1968 | Venable |
| 3,415,383 | A | 12/1968 | Earle, Jr. et al. |
| 6,033,450 | A | 3/2000 | Krul et al. |
| 7,900,749 | B2 | 3/2011 | Regonini |
| 8,231,714 | B2 | 7/2012 | Cornet et al. |
| 2023/0044147 | A1* | 2/2023 | Baker-Ostiguy ...... F04D 29/083 |
| 2023/0044553 | A1* | 2/2023 | Baker-Ostiguy ........ F04D 9/003 |
| 2024/0401529 | A1* | 12/2024 | Alecu ................... F16C 33/782 |

* cited by examiner

*Primary Examiner* — William H Rodriguez
(74) *Attorney, Agent, or Firm* — NORTON ROSE FULBRIGHT CANADA LLP

(57) ABSTRACT

A de-aerator has: a housing defining an air-oil inlet, an oil outlet, and an air outlet; a rotor within the housing and rotatable about a rotation axis and having: inner and outer rims and blades, passages between the blades and communicating with the air-oil inlet; a conduit extending around the rotation axis and defining a central passage extending axially and communicating with the air outlet, the conduit being radially spaced apart from the outer rim by radial passages communicating with the oil outlet; and openings located inwardly of the blades and communicating with the central passage, wherein one or more of: a cross-sectional area of the central passage taken on a plane transverse to the rotation axis increasing in an axial direction away from the air-oil inlet; and the openings located at least partially radially between an inner face of the conduit and an outer face of the inner rim.

20 Claims, 7 Drawing Sheets

ACTIVE DE-AERATOR FOR AIRCRAFT POWER PLANT

TECHNICAL FIELD

The disclosure relates generally to aircraft power plants and, more particularly, to systems and methods used to lubricate and cool components of such aircraft power plants using oil, and to systems and methods used to separate air from air-oil mixture flowing in these aircraft power plants.

BACKGROUND

Aircraft power plants include lubrication systems for distributing oil to components of the engine in need of lubrication. This oil may be directed to and from a bearing cavity, for example. With use, air may become mixed with said oil. A de-aerator may be used in the lubrication system to remove at least a portion of the air from the oil. Existing de-aerator are satisfactory to some extend, but there remain needs for improvements.

SUMMARY

In one aspect, there is provided a de-aerator for an aircraft power plant, comprising: a housing defining an air-oil inlet, an oil outlet, and an air outlet; a rotor received within the housing and rotatable relative to the housing about a rotation axis, the rotor having: an inner rim, an outer rim located outwardly of the inner rim, and blades circumferentially distributed around the rotation axis and extending from the inner rim to the outer rim, passages defined between the blades and communicating with the air-oil inlet; a conduit extending around the rotation axis and defining a central passage extending axially relative to the rotation axis and communicating with the air outlet, the conduit being radially spaced apart from the outer rim by radial passages communicating with the oil outlet; and openings located radially inwardly of the blades, the openings communicating with the central passage of the conduit, wherein one or more of: a cross-sectional area of the central passage taken on a plane transverse to the rotation axis increasing in an axial direction away from the air-oil inlet; and the openings located at least partially radially between an inner face of the conduit and an outer face of the inner rim.

The de-aerator described above may include any of the following features, in any combinations.

In some embodiments, the cross-sectional area of the central passage increases and the openings are at least partially located radially between the inner face of the conduit and the outer face of the inner rim.

In some embodiments, an inner diameter of the central passage is equal to or greater than an outer diameter of the inner rim.

In some embodiments, the central passage has a frusto-conical shape.

In some embodiments, an angle defined between the rotation axis and the outer face ranges from 2 to 3 degrees.

In some embodiments, the housing has a forward end and a rearward end opposite the forward end, the air-oil inlet defined at the forward end, a shaft rotatable about the rotation axis, the shaft extending from a fore end at the air-oil inlet to a rear end relative to the rotation axis, the rotor drivingly engaged to, and mounted on, the shaft at the fore end, the rear end of the shaft located at the rearward end of the housing and drivingly engageable to a power source for rotation of the shaft and of the rotor mounted thereto.

In some embodiments, an inlet conduit is mounted to the forward end of the housing and in fluid flow communication with the air-oil inlet, the inlet conduit enclosing an inlet plenum.

In some embodiments, the inlet conduit has an outlet communicating with the air-oil inlet and a plurality of inlets each fluidly connectable to a respective component of the aircraft power plant.

In some embodiments, the housing defines a plurality of vanes extending inwardly towards the rotation axis and across the air-oil inlet, the plurality of vanes having radially-inner ends mounted to a hub, the fore end of the shaft extending through the hub.

In some embodiments, an inlet cross-sectional area of the air-oil inlet taken on the plane transverse to the rotation axis has an annular shape, the inlet cross-sectional area decreasing towards the rotor.

In another aspect, there is provided an aircraft power plant, comprising: an internal combustion engine; and an oil system operatively connected to the internal combustion engine for cooling and/or lubricating the internal combustion engine, the oil system having: an oil tank containing a volume of oil; a pump fluidly connected to the oil tank and operable for driving a flow of the oil from the oil tank to the internal combustion engine; and a de-aerator having an air-oil inlet fluidly connected to one or more of the oil tank and a scavenge outlet of the internal combustion engine, an air outlet fluidly connected to an environment outside the oil system, and an oil outlet fluidly connected to the pump, the de-aerator having: a housing defining the air-oil inlet, the oil outlet, and an the outlet of the de-aerator, a rotor received within the housing and rotatable relative to the housing about a rotation axis, the rotor having: an inner rim, an outer rim located outwardly of the inner rim, and blades circumferentially distributed around the rotation axis and extending from the inner rim to the outer rim, passages defined between the blades and communicating with the air-oil inlet; a conduit extending around the rotation axis and defining a central passage extending axially relative to the rotation axis and communicating with the air outlet, the conduit being radially spaced apart from the outer rim by radial passages communicating with the oil outlet; and openings located radially inwardly of the blades, the openings communicating with the central passage of the conduit, wherein one or more of: the central passage expanding in an axial direction relative to the rotation axis and away from the rotor; and the openings at least partially radially aligned with a radial gap defined between an inner face of the conduit and an outer face of the inner rim.

The aircraft power plant described above may include any of the following features, in any combinations.

In some embodiments, the central passage expands in the axial direction and the openings at least partially radially aligned with the radial gap.

In some embodiments, an inner diameter of the central passage is equal to or greater than an outer diameter of the inner rim.

In some embodiments, the central passage has a frusto-conical shape.

In some embodiments, an angle defined between the rotation axis and the outer face ranges from 2 to 3 degrees.

In some embodiments, the housing has a forward end and a rearward end opposite the forward end, the air-oil inlet defined at the forward end, a shaft rotatable about the rotation axis, the shaft extending from a fore end at the air-oil inlet to a rear end relative to the rotation axis, the rotor drivingly engaged to, and mounted on, the shaft at the fore end, the rear end of the shaft located at the rearward end of the housing and drivingly engageable to a power source for rotation of the shaft and of the rotor mounted thereto.

In some embodiments, an inlet conduit is mounted to the forward end of the housing and in fluid flow communication with the air-oil inlet, the inlet conduit enclosing an inlet plenum.

In some embodiments, the inlet conduit has an outlet communicating with the air-oil inlet and a plurality of inlets each fluidly connected to a respective one of the other components.

In some embodiments, the housing defines a plurality of vanes extending inwardly towards the rotation axis and across the air-oil inlet, the plurality of vanes having radially-inner ends mounted to a hub, the fore end of the shaft extending through the hub.

In some embodiments, an inlet cross-sectional area of the air-oil inlet taken on a plane transverse to the rotation axis has an annular shape, the inlet cross-sectional area decreasing towards the rotor.

BRIEF DESCRIPTION OF THE DRAWINGS

Reference is now made to the accompanying figures in which.

DETAILED DESCRIPTION

Figure 1:
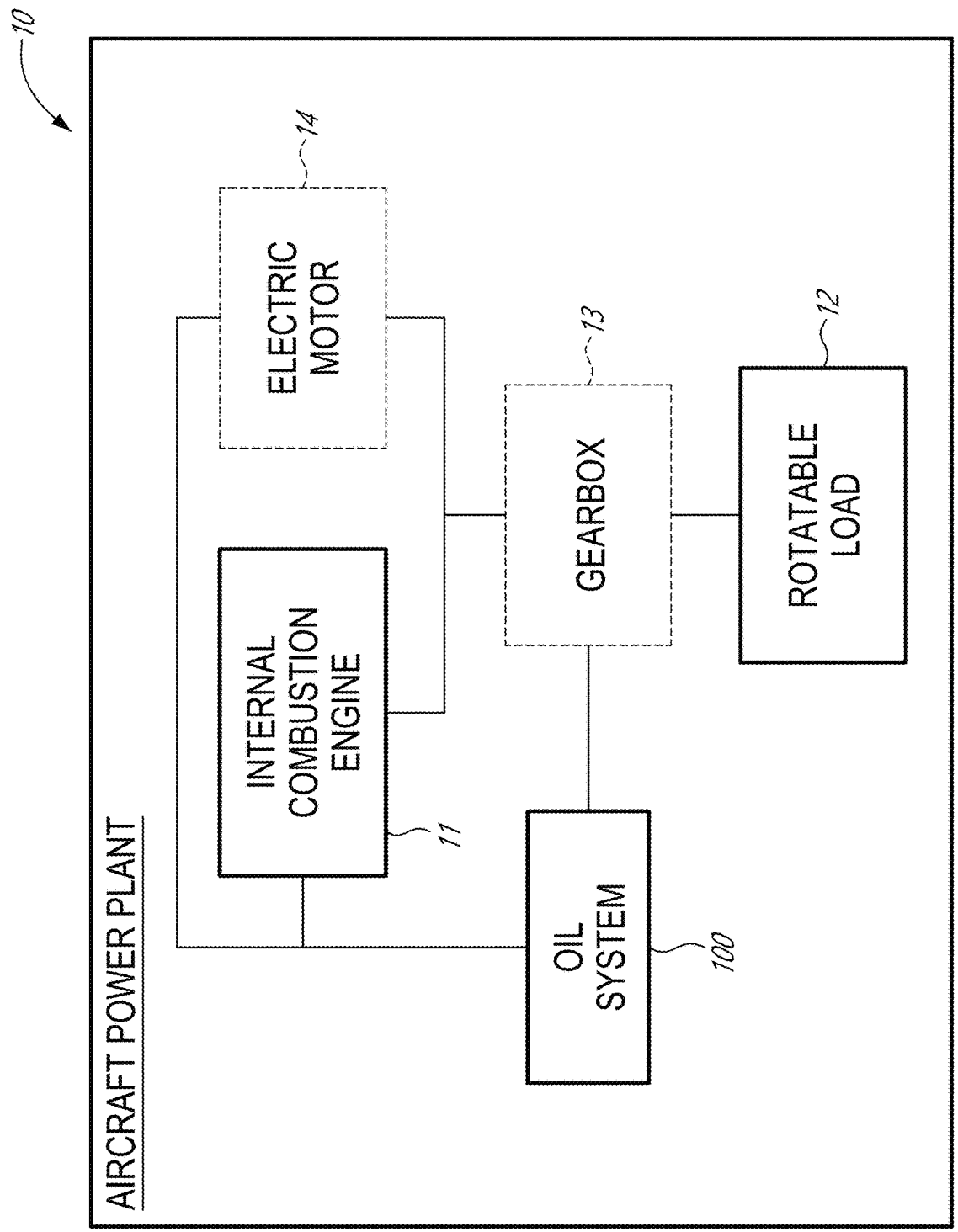
FIG. 1 is a schematic view of an aircraft power plant.

Referring to FIG. 1, there is depicted an aircraft power plant 10 including an internal combustion engine 11 of the intermittent type such as a piston engine or a rotary engine. The internal combustion engine 11 is drivingly engaged to a rotatable load 12 such as a propeller. In some configurations, a gearbox 13 may be used to change a speed ratio between a rotational speed of the rotatable load 12 and that of a shaft of the internal combustion engine 11. In other words, the internal combustion engine 11 is drivingly engaged to the rotatable load 12 via the gearbox 13. In this embodiment, the aircraft power plant 10 is a hybrid power plant in that it includes an electric motor 14 also drivingly engaged to the rotatable load 12 either through the gearbox 13, through another gearbox, or directly. It will be appreciated that the aircraft power plant 10 need not be a hybrid and may include only the internal combustion engine 11 or only the electric motor 14 in some alternative embodiments.

The aircraft power plant 10 includes an oil system 100 that is used for lubricating and cooling components of the internal combustion engine 11, of the electric motor 14, and of the gearbox 13. The oil system 100 is configured to flow a flow of oil to the different components that need lubrication and/or cooling as will be further discussed below.

Figure 2:
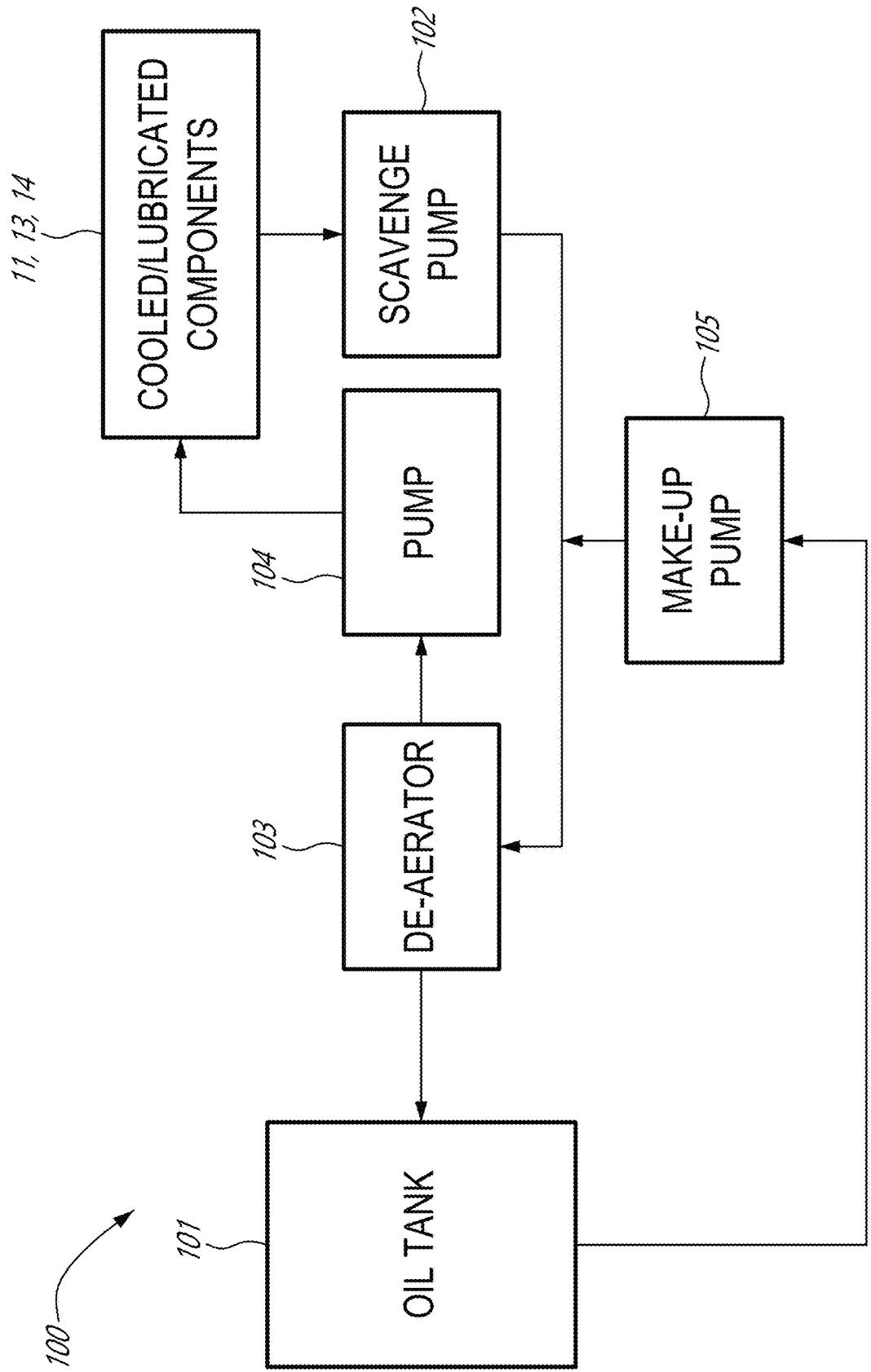
FIG. 2 is a schematic view of an oil system of the aircraft power plant of FIG. 1.

Referring to FIG. 2, the oil system 100 is described in greater details. The oil system 100 includes an oil tank 101 that contains a volume of oil. As illustrated, the oil system 100 may include two loops, namely, an engine loop and an make-up loop. The engine loop is used to flows the oil through the components (e.g., internal combustion engine 11, gearbox 13, electric motor 14, and so on) that need lubrication and/or cooling. This oil is scavenged via an optional scavenge pump 102. The scavenge pump may be omitted in some configurations where an air-oil mixture is driven by a pressure differential between the lubricated components and the de-aerator. During its passage through the different components, the oil may become mixed with air. The scavenge pump 102 is used to receive an air-oil mixture exiting the components and flows this mixture through a de-aerator 103 that separates the oil and the air from the air-oil mixture. An oil flow exiting the de-aerator 103 is fed to a pump 104, which may be referred to as a main oil pump, that induces an oil flow through the different components and the cycles continues.

However, with time, some oil may be burned away, may leak out of the different components, or oil could temporarily accumulate in the cooled/lubricated components during transient maneuvers. It may thus be required to supplement the engine loop with more oil. To do so, the make-up loop is used. More specifically, a make-up pump 105 is fluidly connected to the oil tank 101 and is configured to drive a make-up flow of the oil from the oil tank 101 to the closed loop. In this configuration the de-aerator 103 receives oil from both of the make-up pump 105 and the scavenge pump 102. The de-aerator 103 is configured to separate the air-oil mixture that is received from both of the make-up pump 105 and the scavenge pump 102, outputs an oil flow to the pump 104 that then drives the oil flow to the different components in need of cooling and lubrication. Air that has been extracted from the oil mixture by then be flown back to the oil tank 101, which is vented to an environment outside the oil tank 101.

In some embodiments, the oil flow required to lubricate the different component of a gas turbine engine might be relatively small compared to an oil flow required to lubricate and cool components of an intermittent combustion engine such as a piston engine or a rotary engine. In other words, if the engine is an intermittent combustion engine, it includes a housing defining cooling passages in which oil may be flown to extract heat generated by the combustion of a fuel in a combustion chamber of engine. The de-aerator 103 used with a power plant including an intermittent combustion engine may therefore be required to deal with a much greater oil flow than for a gas turbine engine.

Figure 3:
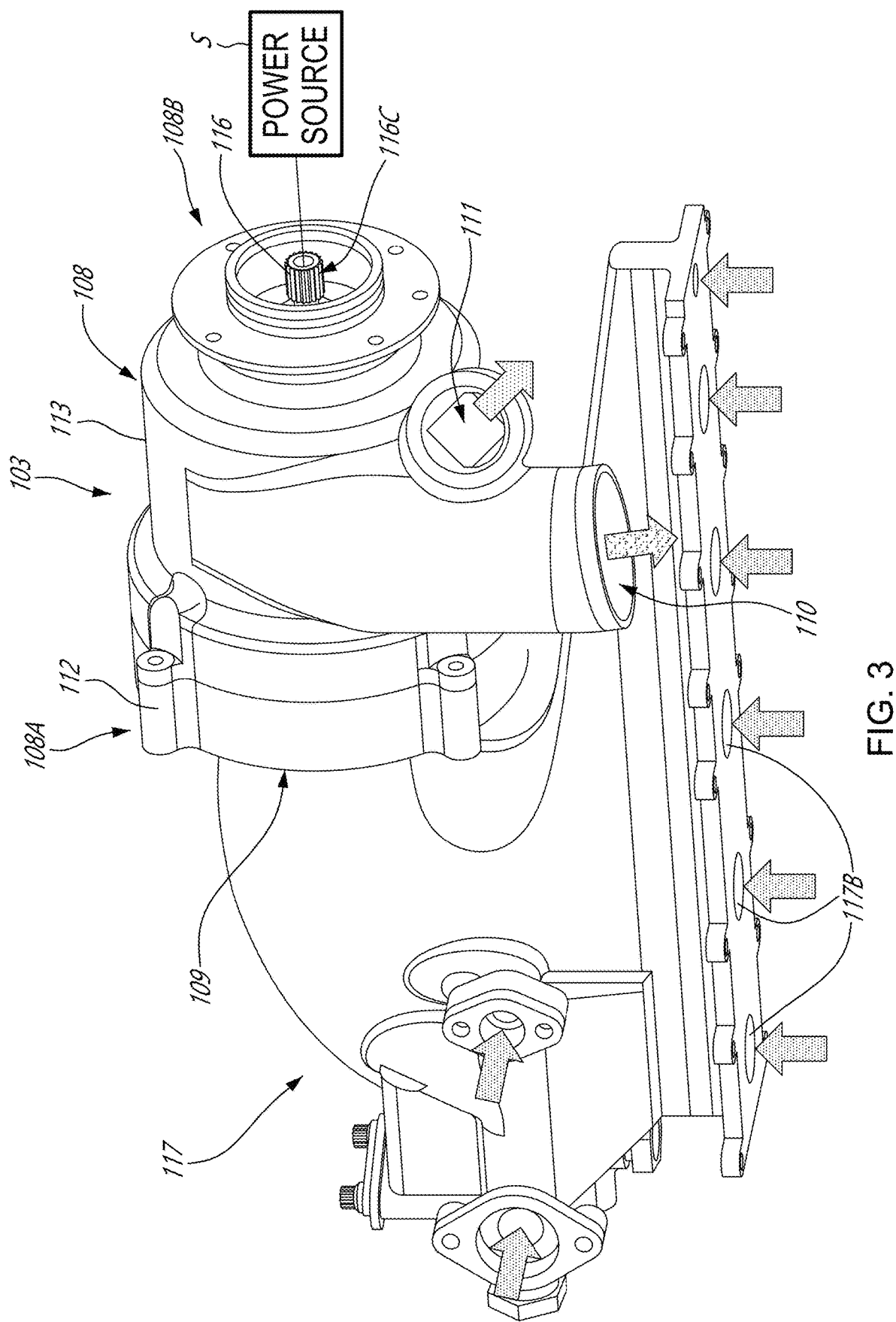
FIG. 3 is a three dimensional view of a de-aerator for the oil system of FIG. 2.
Figure 4:
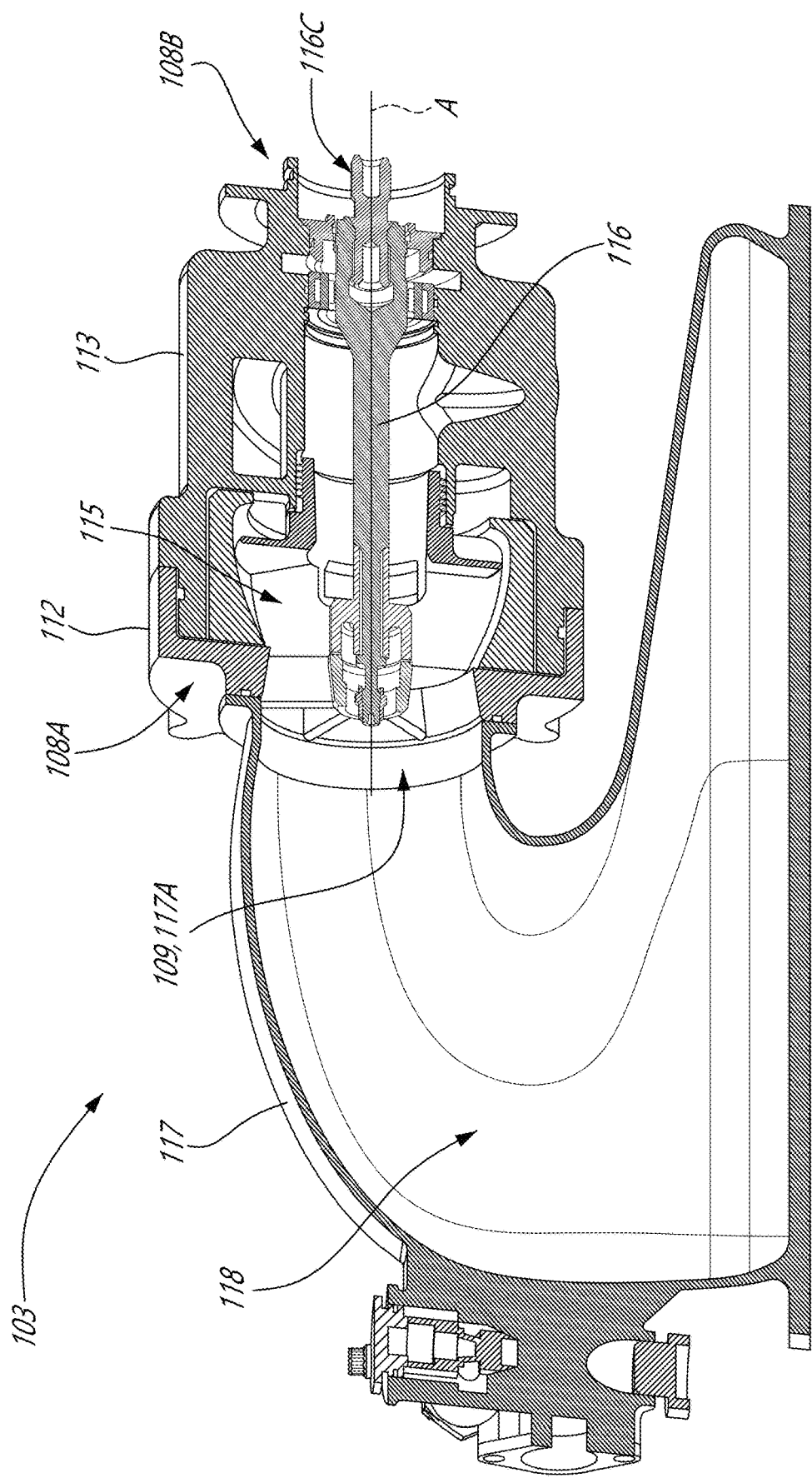
FIG. 4 is a three dimensional cutaway view of the de-aerator of FIG. 3.
Figure 5:
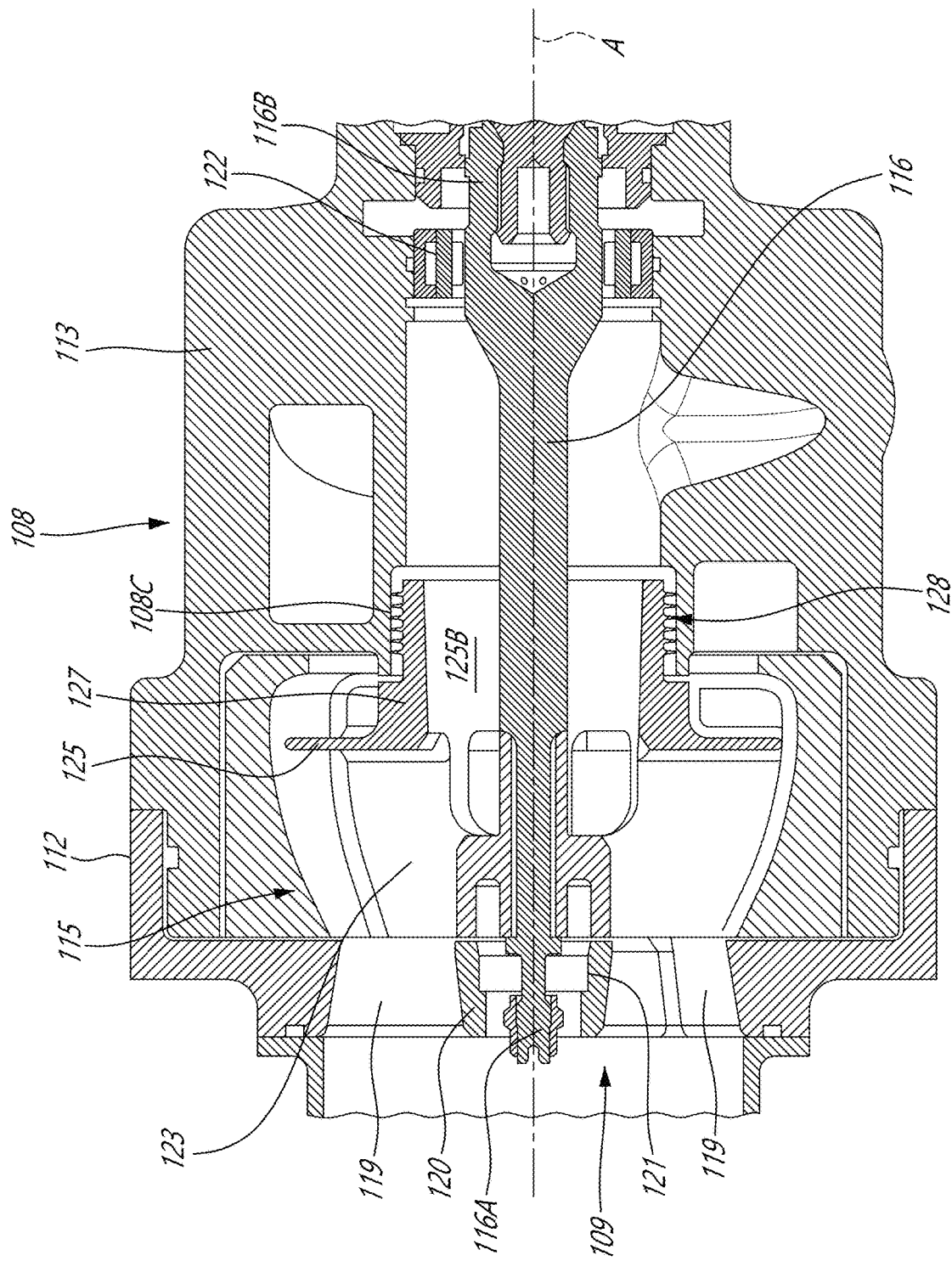
FIG. 5 is a cross-sectional view of the de-aerator of FIG. 3.

Referring now to FIGS. 3-5, the de-aerator 103, which may be used with the oil system 100 described above, is shown. This de-aerator 103 may alleviate flow rate restrictions of existing de-aerators.

The de-aerator 103 includes a housing 108 defining an air-oil inlet 109 fluidly connected to an outlet of the make-up pump 105 and to an outlet of the scavenge pump 102, an oil outlet 110 fluidly connected to an inlet of the pump 104, and an air outlet 111 fluidly connected to the oil tank 101 which is vented outboard. It will be appreciated that the fluid exiting the air outlet 111 is mostly air, but may contain a small portion of oil. The air outlet 111 may also output oil not needed by the main oil pump. The housing 108 has a forward end 108A and a rearward end 108B opposite the forward end 108A. In this embodiment, and as will be described in further detail below, the air-oil inlet 109 is defined at the forward end 108A of the housing 108. In the context of the present disclosure, expressions "forward" and "rearward" are in relation to an incoming flow of an air-oil mixture.

The housing 108 includes a fore housing section 112 and a rear housing section 113 secured to one another via any suitable fastening means such as bolts. The fore housing section 112 and the rear housing section 113 respectively define the forward end 108A and the rearward end 108B of the housing 108. The fore housing section 112 and the rear housing section 113 conjointly define an inner cavity for receiving other components of the de-aerator 103.

As depicted in FIGS. 4-5, the de-aerator 103 includes a rotor 115 received within the inner cavity of the housing 108. In other words, the rotor 115 is enclosed conjointly by the fore housing section 112 and the rear housing section 113. The rotor 115 is located at the forward end 108A of the housing 108 and is rotatable relative to the housing 108 about a rotation axis A. The rotor 115 is drivingly engaged by a shaft 116 being rotatable about the rotation axis A.

The shaft 116 axially extends from a fore end 116A at the air-oil inlet 109 to a rear end 116B relative to the rotation axis A. The rotor 115 is drivingly engaged to, and mounted on, the shaft 116 at the fore end 116A. It will be appreciated that the expression "at the fore end" is not limited to a terminal end of the shaft 166, but includes the forward section of the shaft that includes the terminal end. The same applies for the expression "at the rear end", which is meant to encompass a rearward section of the shaft 116. The rear end 116B of the shaft 116 is located at the rearward end 108B of the housing 108 and drivingly engageable to the power source for rotation of the shaft 116 and of the rotor 115 mounted thereto. The shaft 116 may be drivingly engaged by any suitable power source, such as an electric motor, an actuator and so on. In some embodiments, the shaft 116 may be drivingly engaged by one or more of the internal combustion engine 11 and the electric motor 14 via any suitable transmission means. A dedicated power source may be used to drive the de-aerator 103.

As shown in FIGS. 3-4, the rear end 116B of the shaft 116 is defined by a coupler 116C that defines coupling means, such as splines, keyway, and so on allowing a driving engagement with a power source S, such as an actuator, the electric motor 14, and/or the internal combustion engine 11. The rear end 116B of the shaft 116 may be engaged to an accessory output on the gearbox 13 in some embodiments. The shaft 116 is herein defined in two parts, that is, a main part and the coupler. However, the shaft may have a single part in some embodiments.

As shown in FIGS. 4-5, the shaft 116 does not interfere with an incoming flow of the air-oil mixture. Put differently, an inlet conduit 117 may be mounted to the forward end 108A of the housing 108 and is in fluid flow communication with the air-oil inlet 109. The inlet conduit 117 encloses an inlet plenum 118 having a conduit outlet 117A fluidly connected to the air-oil inlet 109 of the de-aerator 103 and a plurality of conduit inlets 117B (FIG. 3) each fluidly connectable to a respective component of the aircraft power plant 10. Put differently, the inlet conduit 117 may be considered a manifold that receives an air-oil mixture from different sources, such as the internal combustion engine 11, the gearbox 13, the electric motor 14, and so on. This mixture may then be converged into the air-oil inlet 109 of the de-aerator 103.

In this embodiment, the inlet plenum 118 of the inlet conduit 117 is devoid of the shaft 116. In other words, the shaft 116 extends solely rearwardly from the air-oil inlet 109 and away from the inlet conduit 117 such that there is no interference created by the shaft 116 to the flow of the air-oil mixture flowing towards the de-aerator 103. Hence, a flow rate of the air-oil mixture to the de-aerator 103 may be increased by keeping the shaft 116 out of the inlet conduit 117. Therefore, in this configuration, the de-aerator 103 is referred to as "rear-driven" since its power for inducing rotation of the rotor 115 is received at the rearward end 108B of the housing 108, which is at an opposite end of the housing 108 than the air-oil inlet 109. This may minimize pressure drop through the de-aerator 103 while maximising a flow of the air-oil mixture. Efficiency gains may be achieved with this configuration.

As seen more specifically on FIG. 5, the housing 108 is used to rotatably support the shaft 116. In some embodiments, a plurality of vanes 119 extend inwardly towards the rotation axis A and across the air-oil inlet 109 from the fore housing section 112. Namely, the plurality of vanes 119 have radially-inner ends mounted to a hub 120 and radially-outer ends mounted to the fore housing section 112. The fore end 116A of the shaft 116 extends through the hub 120. A fore bearing 121, or other rolling means, may be mounted radially between the hub 120 and the fore end of the shaft 116. In some embodiments, an inlet cross-sectional area of the air-oil inlet taken on the plane transverse to the rotation axis A has an annular shape. The inlet cross-sectional area may decrease towards the rotor. This may increase a speed of the air-oil upstream of the rotor and may improve separation of the oil from the air-oil mixture.

To avoid the shaft 116 from being cantilevered, it may be desired to support a rear end of the shaft 116. To this end, the rear end of the shaft 116 is rotatably supported via a rear bearing 122 disposed radially between the shaft 116 and a portion of the rear housing section 113. The rear bearing 122 is located at the rearward end 108B of the housing 108. The bearings may be roller bearings, ball bearings, journal bearings, and so on. In some embodiments, only the rear bearing is present and the shaft 116 may be cantilevered from the rear bearing.

Figure 6:
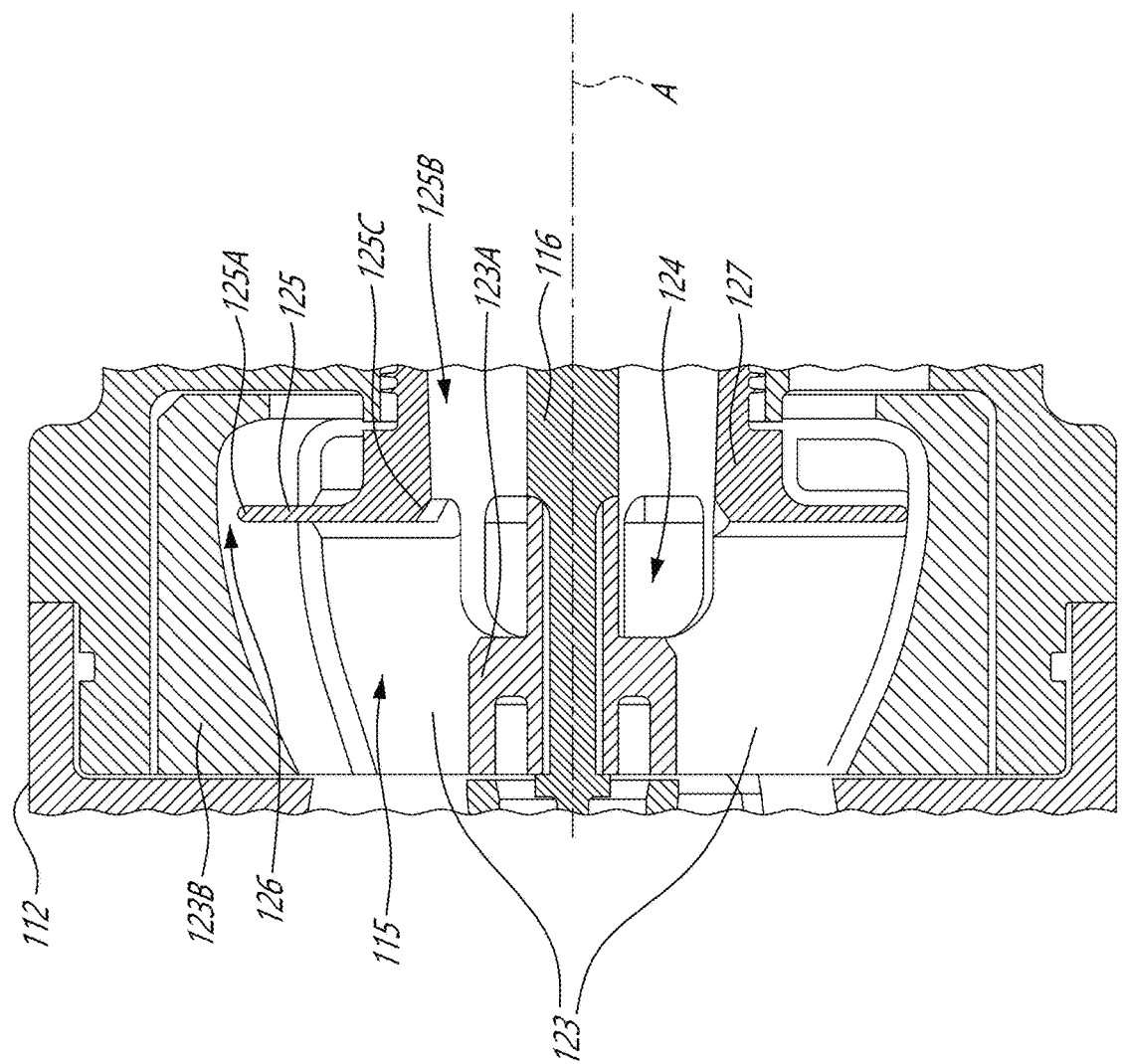
FIG. 6 is an enlarged view of a portion of FIG. 5 illustrating a rotor of the de-aerator.

Referring more particularly to FIG. 6, the rotor 115 includes blades 123 circumferentially distributed around the rotation axis A and extending from an inner rim 123A to an outer rim 123B located radially outwardly of the inner rim 123A. It will be appreciated that the inner rim 123A, the outer rim 123B, and the blades 123 are part of a body that rotates around the rotation axis A. The body may be an assembly or a monolithic body. The blades 123 define flow passages therebetween for receiving the air-oil mixture. Openings 124 are located radially inwardly of the blades 123 and receive air of this air-oil mixture. In this embodiment, the openings 124 are cut-outs defined at a radially-inner ends of the blades 123, but other configurations are contemplated.

The rotor 115 further includes an annular flange 125 extending around the rotation axis A and extending transversally to the blades 123. The annular flange 125 extends circumferentially around the central axis A and radially outwardly from a central passage 125B to an outer periphery 125A located radially outwardly of the openings 124 defined through the blades 123. The outer periphery 125A of the annular flange 125 is radially spaced from the outer rim 123B by radial passages 126. The radial passages 126 are in fluid communication with the oil outlet 110. As illustrated, the shaft 116 extends through the central passage 125B.

Referring to FIGS. 5-6, the rotor 115 further has a tubular body or conduit 127 extending from a radially inner periphery 125C of the annular flange 125 axially away from the forward end 108A of the housing 108. The conduit 127 defines the central passage 125B. The conduit 127 is axially offset from the air-oil inlet 109 of the de-aerator 103. The conduit 127 is received within a bore 108C defined by the housing 108, herein by the rear housing section 113. The bore 108C is bounded by a peripheral wall. A seal 128, such as a labyrinth seal or any suitable seal, is located radially between the conduit 127 and the peripheral wall of the bore 108C. The seal 128 is configured to limit oil from leaking into the air outlet 111 of the de-aerator 103. The labyrinth seal of this configuration includes fins protruding radially outwardly from the conduit 127. The fins may alternatively protrude radially inwardly from the rear housing section 113. The openings 124 defined through the blades 123 communicate with the central passage 125B defined by the conduit 127. The central passage 125B may be referred to as a conduit for the air.

In use, the blades 123 rotate about the central axis A and are configured to impinge on the air-oil mixture. The impingement causes the oil to coalesce on the blades 123. Then, the oil migrates away from the rotation axis A via centrifugation until it reaches the outer rim 123B. The oil then flows through the radial passages 126 and exits the de-aerator 103 via the oil outlet 110. The air being freed from the air-oil mixture following impingement flows radially inwardly via the openings 124 defined through the blades 123 and exits the de-aerator 103 via the central passage 125B of the conduit 127 and the air outlet 111. As aforementioned, any excess oil not needed by downstream components may flow through the air outlet 111.

Other features of the rotor 115 are described U.S. Pat. No. 11,994,257, the entire contents of which are incorporated by reference herein.

Figure 7:
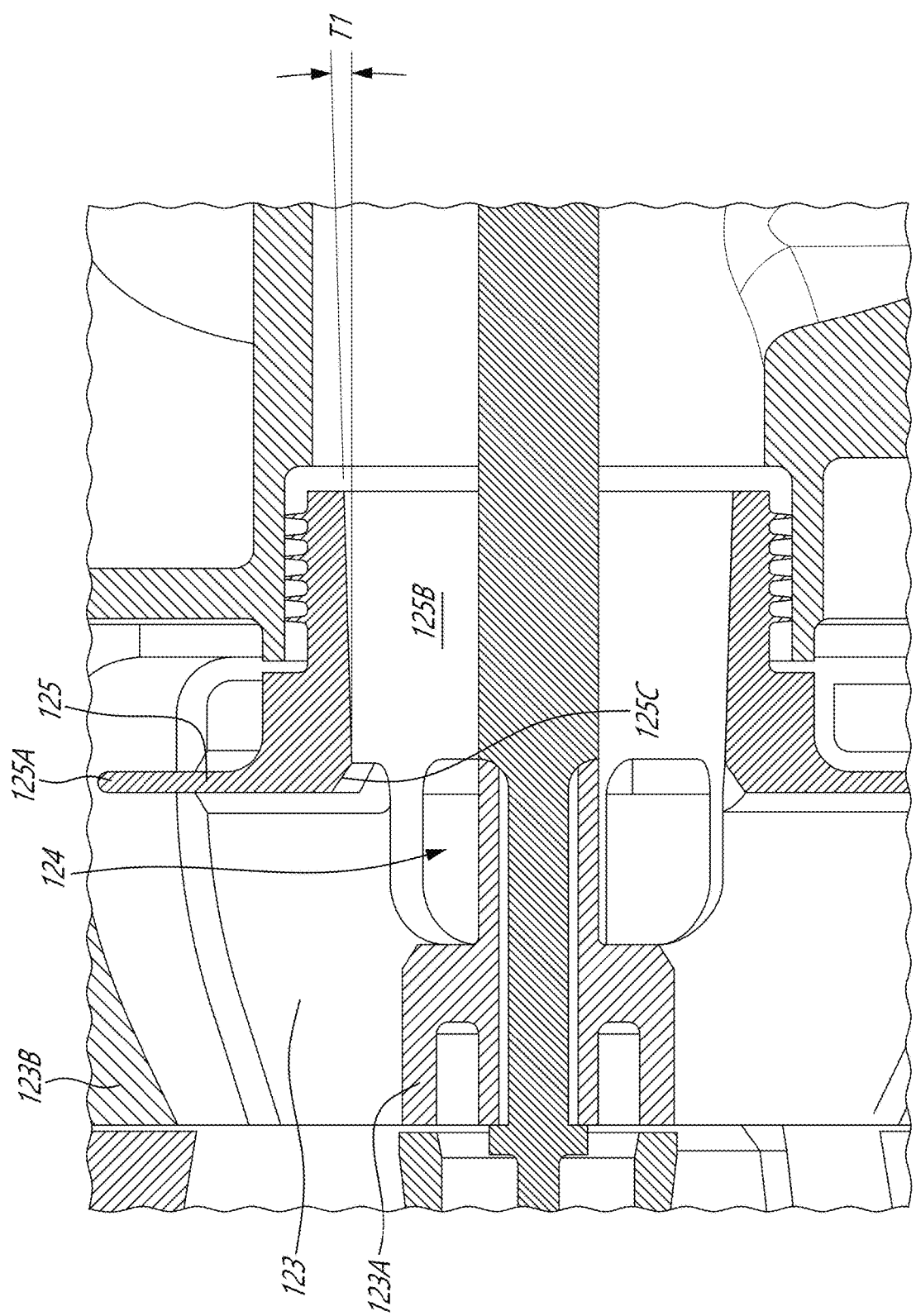
FIG. 7 is an enlarged view of a portion of FIG. 6.

Referring now to FIG. 7, other features of the de-aerator 103 are described below. In the embodiment shown, a cross-sectional area of the central passage 125B of the conduit 127 taken on a plane transverse to the rotation axis A increases in rearward axial direction away from the air-oil inlet 109. In other words, the central passage 125B expands in the axial direction relative to the rotation axis A and away from the rotor 115. In the embodiment shown, the central passage 125B has a frustoconical shape. An angle T1 defined between the rotation axis A and a peripheral face of the conduit 127 defining the central passage ranges from about 2 to about 3 degrees. Herein, the expression "about" implies variations of plus or minus 10%. Having an expanding central passage as such may impede a liquid flow flowing back towards the air outlet of the de-aerator 103. The conical shape opening towards the air outlet 111 may ensure a free surface liquid flow driven by the centrifugal force.

In some embodiments, at least a portion of the openings 124 are located radially between the inner periphery 125C of the annular flange 125 and the inner rim 123A. In other words, the openings 124 are located at least partially radially between an inner face of the conduit 127 and an outer face of the inner rim 123A. The inner face of the conduit 127 bounds the central passage 125B whereas the outer face of the inner rim 123A faces away from the central axis A. Stated differently, the openings 124 are at least partially radially aligned with a radial gap defined between the inner face of the conduit 127 and the outer face of the inner rim 123A. In this embodiment, the conduit 127 and the inner rim 123A are axially offset from one another; the openings 124 located axially therebetween. This configuration may be achieved by having an inner diameter of the central passage 125B at the inner periphery 125C of the annular flange 125 being equal to or greater than an outer diameter of the inner rim 123A. The difference in diameters may help to reduce a fight against centrifugal forces for the mixture by avoiding a large radius change for the flow path.

The disclosed de-aerator 103 may be able to cater to an increased flow of an air-oil mixture at least because of the rotor 115 being rear driven resulting in an incoming flow of the mixture being unaffected by the shaft 116 driving the rotor 115. Efficiency gains and performance gains may be achieved. Moreover, an axial length of the de-aerator 103 may be reduced by having the rotor 115 rear-driven as opposed to fore driven.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A de-aerator for an aircraft power plant, comprising:
a housing defining an air-oil inlet, an oil outlet, and an air outlet;
a rotor received within the housing and rotatable relative to the housing about a rotation axis, the rotor having:
an inner rim, an outer rim located outwardly of the inner rim, and blades circumferentially distributed around the rotation axis and extending from the inner rim to the outer rim, passages defined between the blades and communicating with the air-oil inlet;
a conduit extending around the rotation axis and defining a central passage extending axially relative to the rotation axis and communicating with the air outlet, the conduit being radially spaced apart from the outer rim by radial passages communicating with the oil outlet; and
openings located radially inwardly of the blades, the openings communicating with the central passage of the conduit,
wherein one or more of:
a cross-sectional area of the central passage taken on a plane transverse to the rotation axis increasing in an axial direction away from the air-oil inlet; and
the openings located at least partially radially between an inner face of the conduit and an outer face of the inner rim.

2. The de-aerator of claim 1, wherein the cross-sectional area of the central passage increases and the openings are at least partially located radially between the inner face of the conduit and the outer face of the inner rim.

3. The de-aerator of claim 1, wherein an inner diameter of the central passage is equal to or greater than an outer diameter of the inner rim.

4. The de-aerator of claim 1, wherein the central passage has a frustoconical shape.

5. The de-aerator of claim 4, wherein an angle defined between the rotation axis and the outer face ranges from 2 to 3 degrees.

6. The de-aerator of claim 1, wherein the housing has a forward end and a rearward end opposite the forward end, the air-oil inlet defined at the forward end, a shaft rotatable about the rotation axis, the shaft extending from a fore end at the air-oil inlet to a rear end relative to the rotation axis, the rotor drivingly engaged to, and mounted on, the shaft at the fore end, the rear end of the shaft located at the rearward end of the housing and drivingly engageable to a power source for rotation of the shaft and of the rotor mounted thereto.

7. The de-aerator of claim 6, comprising an inlet conduit mounted to the forward end of the housing and in fluid flow communication with the air-oil inlet, the inlet conduit enclosing an inlet plenum.

8. The de-aerator of claim 7, wherein the inlet conduit has an outlet communicating with the air-oil inlet and a plurality of inlets each fluidly connectable to a respective component of the aircraft power plant.

9. The de-aerator of claim 6, wherein the housing defines a plurality of vanes extending inwardly towards the rotation axis and across the air-oil inlet, the plurality of vanes having radially-inner ends mounted to a hub, the fore end of the shaft extending through the hub.

10. The de-aerator of claim 9, wherein an inlet cross-sectional area of the air-oil inlet taken on the plane transverse to the rotation axis has an annular shape, the inlet cross-sectional area decreasing towards the rotor.

11. An aircraft power plant, comprising:
an internal combustion engine; and
an oil system operatively connected to the internal combustion engine for cooling and/or lubricating the internal combustion engine, the oil system having:
an oil tank containing a volume of oil;
a pump fluidly connected to the oil tank and operable for driving a flow of the oil from the oil tank to the internal combustion engine; and
a de-aerator having an air-oil inlet fluidly connected to one or more of the oil tank and a scavenge outlet of the internal combustion engine, an air outlet fluidly connected to an environment outside the oil system, and an oil outlet fluidly connected to the pump, the de-aerator having:
a housing defining the air-oil inlet, the oil outlet, and an the outlet of the de-aerator,
a rotor received within the housing and rotatable relative to the housing about a rotation axis, the rotor having: an inner rim, an outer rim located outwardly of the inner rim, and blades circumferentially distributed around the rotation axis and extending from the inner rim to the outer rim, passages defined between the blades and communicating with the air-oil inlet; a conduit extending around the rotation axis and defining a central passage extending axially relative to the rotation axis and communicating with the air outlet, the conduit being radially spaced apart from the outer rim by radial passages communicating with the oil outlet; and openings located radially inwardly of the blades, the openings communicating with the central passage of the conduit,
wherein one or more of:
the central passage expanding in an axial direction relative to the rotation axis and away from the rotor; and
the openings at least partially radially aligned with a radial gap defined between an inner face of the conduit and an outer face of the inner rim.

12. The aircraft power plant of claim 11, wherein the central passage expands in the axial direction and the openings at least partially radially aligned with the radial gap.

13. The aircraft power plant of claim 11, wherein an inner diameter of the central passage is equal to or greater than an outer diameter of the inner rim.

14. The aircraft power plant of claim 11, wherein the central passage has a frustoconical shape.

15. The aircraft power plant of claim 14, wherein an angle defined between the rotation axis and the outer face ranges from 2 to 3 degrees.

16. The aircraft power plant of claim 11, wherein the housing has a forward end and a rearward end opposite the forward end, the air-oil inlet defined at the forward end, a shaft rotatable about the rotation axis, the shaft extending from a fore end at the air-oil inlet to a rear end relative to the rotation axis, the rotor drivingly engaged to, and mounted on, the shaft at the fore end, the rear end of the shaft located at the rearward end of the housing and drivingly engageable to a power source for rotation of the shaft and of the rotor mounted thereto.

17. The aircraft power plant of claim 16, comprising an inlet conduit mounted to the forward end of the housing and in fluid flow communication with the air-oil inlet, the inlet conduit enclosing an inlet plenum.

18. The aircraft power plant of claim 17, further comprising other components in need of cooling, the inlet conduit has an outlet communicating with the air-oil inlet and a plurality of inlets each fluidly connected to a respective one of the other components.

19. The aircraft power plant of claim 16, wherein the housing defines a plurality of vanes extending inwardly towards the rotation axis and across the air-oil inlet, the plurality of vanes having radially-inner ends mounted to a hub, the fore end of the shaft extending through the hub.

20. The aircraft power plant of claim 19, wherein an inlet cross-sectional area of the air-oil inlet taken on a plane transverse to the rotation axis has an annular shape, the inlet cross-sectional area decreasing towards the rotor.

\* \* \* \* \*